Dec. 15, 1925.

Re. 16,229

C. E. BLYTH

MACHINE FOR THE PRODUCTION OF POWDERED FUEL

Original Filed April 18, 1921 2 Sheets-Sheet 1

WITNESSES
Chas. H. Richards
Hazel Clemence

INVENTOR
Charles E. Blyth
BY
Clifton Jenkins
ATTORNEY

Dec. 15, 1925 Re. 16,229

C. E. BLYTH

MACHINE FOR THE PRODUCTION OF POWDERED FUEL

Original Filed April 18, 1921 2 Sheets-Sheet 2

WITNESSES
Chas. H. Richards
Hazel Clemence

INVENTOR
Charles E. Blyth
BY
Clayton H. Jenks
ATTORNEY

Reissued Dec. 15, 1925. Re. 16,229

UNITED STATES PATENT OFFICE.

CHARLES EDWARD BLYTH, OF DUNCHURCH, NEAR RUGBY, ENGLAND.

MACHINE FOR THE PRODUCTION OF POWDERED FUEL.

Original No. 1,446,151, dated February 20, 1923, Serial No. 462,270, filed April 18, 1921. Application for reissue filed December 9, 1924. Serial No. 754,864.

*To all whom it may concern:*

Be it known that I, CHARLES EDWARD BLYTH, a subject of the King of Great Britain, residing at Dunchurch, near Rugby, in the county of Warwick, England, have invented new and useful Improvements in Machines for the Production of Powdered Fuel, of which the following is a specification.

This invention relates to a pulverizing machine and more particularly to a machine which has sets of interfitting, revolving and stationary impact bodies on a rotor and the casing wall respectively arranged to pulverize the material fed thereto.

One object of my invention is to provide a simply constructed, efficient and economically operated machine which is particularly adapted for pulverizing fuel, as well as other materials, and which will pulverize the same to a desired degree of fineness.

Another prime object is to provide a single and complete unit capable of crushing, drying and finely grinding the material fed thereto and delivering the same without the aid of accessory apparatus.

With these and other objects in view as will be apparent to one skilled in the art, my invention resides in the combination of parts set forth in the following specification and covered by the claims appended hereto.

In accordance with my invention, I provide an apparatus which has two pulverizing zones, the first for preliminarily breaking the material and the second for grinding it finely. The pulverizing operation is obtained by means of a rotor and impact bodies revolved rapidly thereby which are so constructed and arranged that the material is broken by impact and attrition. The rotor is preferably constructed as a disk spaced peripherally and laterally from the casing walls to form two zones connected by an annular passage around the periphery of the disk. The impact bodies are preferably shaped as pegs and several interfitting sets of these pegs are mounted on the rotor and the opposed casing wall so that the rotor pegs may serve as impellers and the others as beaters to break the material therebetween. The ends of the pegs of one set, and preferably those on the rotor, may be separated from the support for the other set so as to provide free passages and recirculating spaces for the material being treated. In the second zone, the outlet is located near the rotor axis and the material is forced by means of a fan to travel against the centrifugal action of the revolving pegs, so that the coarse material is constantly hurled towards the periphery of the rotor. As a safeguard to prevent the escape of coarse particles from the pulverizing chamber, I provide a rejecting device, preferably comprising blades revoluble with the disk, which throws the coarse particles back into the paths of the pegs and permits only a fine dust cloud to escape therethrough.

Referring to the drawings, I have there illustrated one embodiment combining all of the above mentioned features of my invention, and in which.

Figure 1:
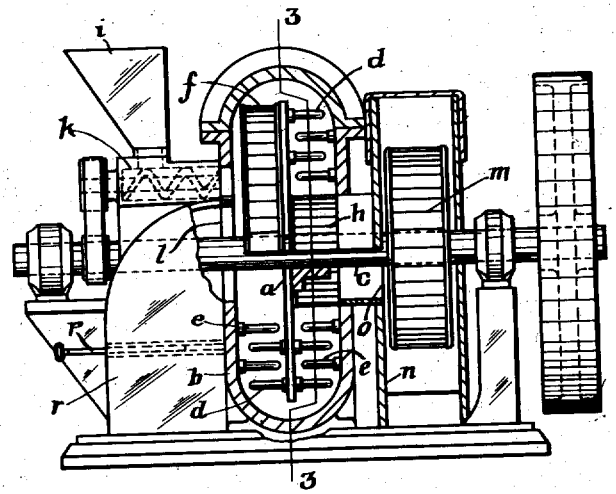
Figure 1 is a longitudinal sectional view of the apparatus.
Figure 2:
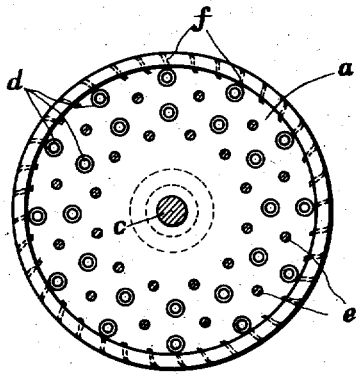
Figures 2 and 3 are sectional views showing opposite faces of the beater disk, Figure 3 being taken on the line 3—3 of Figure 1.
Figure 3:
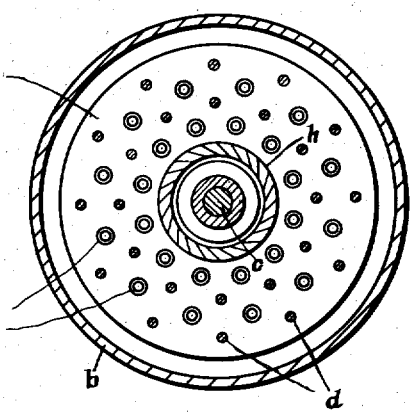

Referring to the drawing, the beater disk *a* of which there may be one only, as shown, is rotatably mounted in a fixed casing *b* through which the driving shaft *c* passes, and is peripherally spaced from the casing to provide a passage for the pulverized material from one side of the disk to the other.

Each face of the said disk carries a series of outwardly projecting impellers or beaters *d* which pass between fixed beaters *e* on the inside walls of the casing. Between the free ends of the impellers *d* and the inside walls of the casing a space which, as shown, is more than sufficient for clearance, is left, to allow for free circulation of the suspended material. This space serves as a passage for the free circulation of the material.

Figure 7:
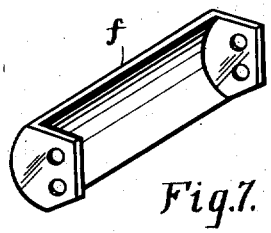
Figure 7 is a perspective view on a larger scale of one or the fan blades or deflectors.
Figure 5:
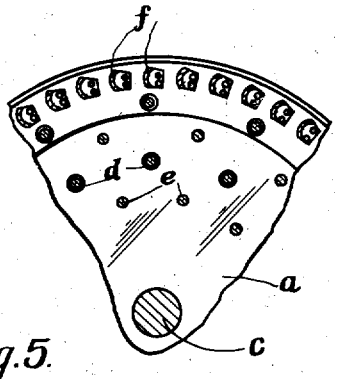

The intake side of the beater disk is provided at its periphery with an annular series of closely arranged transversely curved fan blades *f* having flanged ends as seen in Figure 7 whereby they are riveted at one end to the disk *a* and at the other end to an annular plate *g*. The object of these blades, the arrangement of which is clearly shown in Figure 5, is to keep the material under treatment against the action of centrifugal force set up by the rotating disk *a*, within the area swept by the beaters until it has been reduced to such fineness that, the effect of centrifugal force on each particle being negligible, it will pass with the air current between the blades *f* and be uniformly distributed thereby around the disk *a* into the second or delivery chamber at the other side of the said disk.

Figure 4:
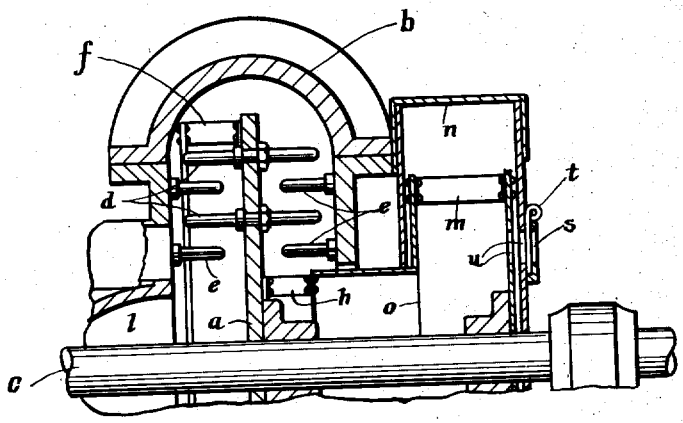
Figure 4 is a sectional view of the upper part of the machine showing more clearly the arrangement of the fan blades on the beater disk and of the contraflow deflectors at the delivery orifice.
Figure 6:
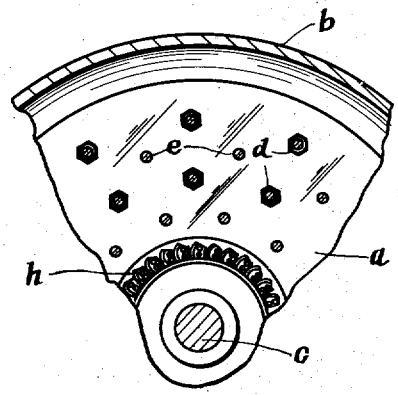
Figures 5 and 6 are each partial side views taken from opposite sides of the beater disk showing the fan blades and contraflow deflectors respectively in section.

On the other or delivery side of the beater disk and surrounding the hub of the same, is a smaller ring of curved deflector blades *h* which are arranged parallel with the axis of the machine and riveted by their flanged ends to the disk *a* and to an extending flange on the main delivery or exhaust fan *m*, as seen in Fig. 4. The blades have deflecting surfaces, as illustrated, which serve, as they revolve, to reject and throw back all coarse particles into the path of the beater pegs. These blades *h* as will be seen from Figure 6 are arranged close together so that only the finely divided particles can float between the blades against the countercurrent set up by their fan like surfaces. This precludes the possibility of any coarse particles that may have found their way into the second or delivery chamber passing through the delivery orifice and returns such particles back amongst the beaters until reduced to the requisite degree of fineness that they will pass with the air current between the blades *h*.

The fuel, previously reduced to about the size of one inch cubes, is fed continuously into one end of the machine from a hopper *i* by means of a feed screw *k* whence it falls amongst and is rapidly reduced by the beaters to a fine powder. At or about the same end of the machine an opening *l* is provided for the entrance of hot air the temperature and pressure of which may be varied. This opening may be suitably adjusted, as by means of a slide damper *p* in the air inlet pipe *r*. The heat of the waste gases from the furnace may be conveniently and economically utilized for heating the air.

A delivery fan *m* is provided at the other side of the machine and arranged within a casing *n* which is in direct communication with the delivery orifice *o* so that fuel passing between the blades *h* may enter the fan casing. The fuel exit is near the axis of the disk so that the powdered material is forced to travel inwardly against the centrifugal force set up by the rotating disk.

It is important to note that the suspended fuel, preliminarily reduced and dried in the inlet compartment, is subject to further reduction by impact, attrition or abrasion in the dense atmosphere formed during its centripetal passage through the delivery compartment toward the central delivery orifice.

It is found that with this machine the fineness of the powdered product can be varied at will by suitably regulating the velocity of exit, as by introducing more or less air direct into the casing of the fan *m*. This may be accomplished by providing one or more openings *s* in the side of the fan casing and covering the same by an adjustable slide valve *t*. Air entering these openings *s* will pass through openings *u* in the fan sides and into the central zone thereof. If this terminal velocity of the material is reduced below the internal maximum velocity produced by the disk *a*, internal circulation is set up, the material delivered at the edge of the disk returning by way of the space provided for the purpose as shown in the drawing between the free ends of the impellers *d* and the adjacent walls of the casing toward the low pressure zones at the center of the disk whence it is again impelled toward the edge of the disk. This takes place to a more or less extent at both sides of the disk so that by the time the material reaches the delivery orifice it is more finely divided than where the path of the material through the machine is comparatively direct, as happens when the terminal velocity of the material equals or exceeds its maximum internal velocity.

The operation of the device, in so far as understood, is about as follows: The coarse material fed into the first zone is struck repeatedly by the revolving pegs and thrown against the stationary pegs as it is moved centrifugally towards the periphery of the disk. The material is thus distributed fairly evenly for passing through the annular space around the disk periphery, whence it is drawn by the fan towards the central outlet. The tendency of the rapidly revolving pegs in the second zone is to throw the particles towards the periphery of the disk, hence only that material will escape through the outlet which is so finely divided that the ratio of its weight to its surface exposure will permit it to be carried by the inwardly moving stream of air against the centrifugal force resulting from the speed of revolution of the moving pegs.

By spacing one set of the pegs from the support for the other, I provide recirculating spaces and free passages outside of the path of the revolving pegs. If these spaces are located adjacent the casing walls, as illustrated, they probably afford a more or less free passage from the entrance to the exit for such material as is finely ground when it enters the casing. In the first zone, this space probably permits the formation of eddy currents and recirculating streams which cause the material to be subjected repeatedly to the action of the moving pegs.

In the second zone, fines may travel along the casing wall without having to pass inwardly between the revolving pegs and so may escape easily to the outlet. If they are not sufficiently fine in size, the revolving rejector blades hurl them back against the pegs. Only a dust cloud can escape, the size of the particles depending on the air velocity, the construction and manner of operating the machine and the nature of the materials fed to the machine.

It will be apparent that this invention is broader in various aspects than as described with reference to the machine illustrated.

I claim:

1. A pulverizing device comprising a stationary casing having a feeding and discharge opening on opposite sides, a disk rotatably mounted in said casing between said openings and having impellers on its opposite sides, beaters secured on the side walls of said casing intermeshing with said disk impellers, fan blades secured to the inlet side of said disk adjacent its rim, and blades secured to said disk on the opposite side thereof from said fan blades forming a conduit for the fines.

2. A pulverizing device comprising a stationary casing having a feeding and a discharge opening on opposite sides, a disk rotatably mounted in said casing between said openings, impellers projecting from opposite sides of said disk with a space more than sufficient for clearance between their free ends and the side walls of said casing, beaters secured on said side walls intermeshing with said disk impellers, a fan chamber communicating with said discharge opening and blades secured to the adjacent side of said disk and constructed and arranged to deflect coarse particles from the discharge opening.

3. A pulverizing device comprising a stationary casing having a feeding and discharge opening on opposite sides, a disk rotatably mounted in said casing between and co-axially with said openings and having impellers projecting from its opposite sides with a space more than sufficient for clearance between the free ends of said impellers and the inside walls of said casing, beaters projecting from the inside walls of said casing, a fan chamber and means adjacent said discharge opening for preventing coarse material passing therethrough into the fan chamber.

4. An apparatus for pulverizing material, comprising a casing having opposed internal walls and inlet and outlet openings on opposite sides, a disk rotatably mounted between said walls and arranged to provide directly connected pulverizing zones on opposite sides thereof, means to pulverize the material in both zones including a set of beater pegs on the casing walls projecting inwardly towards one side of the disk, and a set of impeller pegs mounted on the disk and revoluble between the beater pegs which are arranged to break the material by successive impacts, one of the sets of pegs being spaced by a considerable distance from the support for the other set to provide a space for free circulation of the material, and means to introduce coarse material and air into the casing and to transport the finely divided material therefrom.

5. An apparatus for pulverizing material comprising a hollow casing having an inlet and a centrally located outlet on opposite sides, a rotor mounted between said inlet and outlet and spaced from the casing to form two grinding zones connected by an annular passage around the rotor, means to pulverize the material in both zones including sets of interfitting pegs on the outlet side of the rotor and the adjacent casing wall arranged to break the material by successive impacts, the pegs on the rotor being spaced by a considerable distance from the casing wall to form a passage for the material, and means for introducing air and coarse material into the casing and for transporting the finely divided material therefrom.

6. An apparatus for pulverizing material comprising a casing having an inlet and a centrally located outlet, a rotor mounted therebetween and spaced from the casing to provide two pulverizing zones connected by an annular passage at the periphery of the rotor, means for introducing coarse material and air into the first zone, means for transporting the air laden with pulverized material from the outlet of the second zone, means to break the material in the first zone, sets of beater pegs on the casing in the second zone which project inwardly towards the rotor and sets of impeller pegs on the rotor in opposition to and revoluble between the beater pegs which are arranged to finely pulverize the material by successive impacts as it passes from the periphery of the rotor towards the outlet.

7. An apparatus for pulverizing material comprising a hollow casing, having opposed side walls, a disk rotatably mounted between said walls and spaced laterally and peripherally from the casing to provide a pulverizing zone on each side of the disk connected by an annular passage for the material, a plurality of series of interfitting impact pegs mounted on both sides of the disk and on said walls, which are spaced and arranged so that the disk may rotate and cause the material to be beaten by successive impacts, means for introducing coarse material centrally into the casing on one side of the disk, means for removing the pulverized material from the central zone of the casing on the other side of the disk and adjustable means permitting a variable flow of air through the casing.

8. A pulverizing apparatus comprising a casing having an inlet and a centrally located outlet, a rotor having a face opposed to the outlet, means to pulverize material fed to the apparatus including sets of interfitting alternately revoluble and stationary impact bodies on said rotor face and the casing wall respectively which are arranged concentric with said outlet, means for transporting the finely divided material towards the outlet and a rejector device arranged to prevent the escape of coarse material through the outlet and to return it to the impact bodies for further treatment.

9. An apparatus for pulverizing material comprising a casing having an inlet and a centrally located outlet, a disk rotatably mounted in and spaced peripherally from the casing to form two pulverizing zones connected by an annular passage around the disk, means for introducing coarse material and air into the first zone, means for removing pulverized material and air from the central portion of the second zone, means to break the material in the first zone, two sets of interfitting impact pegs in the second zone mounted on the casing and the disk, respectively to pulverize the material by successive impacts and means to prevent the escape of coarse material from the second zone.

10. A pulverizing apparatus comprising a hollow casing having centrally located inlet and outlet openings in opposite walls, a rotor disk mounted in the casing with its axis adjacent said outlet and spaced laterally and peripherally from the walls to form two grinding zones connected by an annular passage around the disk, means providing for the introduction of coarse material and air into the first grinding zone, revoluble impact devices to break up the coarse material in the first zone, interfitting sets of alternately staionary and moving impact pegs on the casing wall and the disk respectively in the second zone which are arranged to pulverize the broken material as it passes from the periphery of the disk and against the centrifugal action of the revolving pegs towards the outlet, and a revoluble rejector adjacent the outlet to return the coarse material to said pegs.

11. A pulverizing apparatus comprising a casing having an inlet and a centrally disposed outlet on opposite sides thereof, a rotor mounted between said inlet and outlet and peripherally spaced from the casing to provide a passage therebetween, a set of stationary beater pegs mounted within the casing and projecting towards the rotor, a set of impeller pegs on each side of the rotor revoluble between the stationary pegs, means for introducing coarse material through said inlet on one side of the rotor, means for withdrawing pulverized material from said outlet on the other side of the rotor, and a rejector device rotatable with the rotor and located adjacent the outlet which permits pulverized material to pass therethrough but prevents egress of coarse material.

12. An apparatus for pulverizing material comprising a casing, a rotor disk revolubly mounted in and spaced peripherally from the casing to provide a passage therebetween, fixed beater pegs mounted within the casing and projecting inwardly towards the disk, impeller pegs on the disk revoluble between the beater pegs, means for introducing coarse material into the casing on one side of the disk, means forming an exit for the pulverized material on the opposite side of the disk and adjacent the axis thereof, means to prevent egress of coarse material through the casing exit and means for causing a variable quantity of air to travel through the casing and carry the pulverized material therefrom.

13. A pulverizing apparatus comprising a casing having an inlet for the coarse material and a centrally located outlet for the pulverized material on opposite sides of the casing, a rotor disk mounted between said openings and spaced peripherally from the casing to provide a passage therebetween, attrition pegs on the casing walls opposite the rotor and on both sides of the rotor which interfit revolubly, means to feed coarse material in to the casing, means for introducing air into the casing, means to remove the air laden with pulverized material from the casing, means for regulating the flow of air through the casing whereby the density of the outgoing air and pulverized material may be regulated, and a deflector capable of permitting passage of the fine material therethrough but returning the coarse material to the attrition zone.

14. An apparatus of the class described comprising walls defining a pulverizing casing and a fan chamber having a centrally located communicating passage therebetween, a rotatable shaft coaxial with said opening, a rotor disk on the shaft widely spaced laterally and peripherally from the casing to form first and second pulverizing zones connected by an annular passage for said material, a fan on the shaft within the fan chamber, impact devices revoluble with said shaft in the first zone, opposed sets of impact bodies on the casing and rotor in the second zone which are arranged to pulverize material therebetween, means for feeding coarse material into the first zone and means for introducing and regulating the passage of air through the apparatus, said parts being so constructed and arranged that the material passes peripherally around the disk and thence against the centrifugal action of the rotor to the passage to the fan chamber.

15. A pulverizing apparatus comprising walls defining a fan chamber and a casing of substantially circular cross section, which have a centrally located opening therebetween, a rotatable shaft mounted in the walls and passing through said opening, a disk and a fan mounted on the shaft within the casing and the fan chamber respectively, the periphery of said disk being spaced from the casing wall to provide an annular passage, impact bodies on the casing and the disk to pulverize material therebetween, means for introducing coarse material into the casing on the opposite side of the disk from the opening, and a rejector device rotatable with the shaft and located adjacent the opening to prevent coarse material passing into the fan chamber.

Signed, this 14th day of November, 1924, at the city of Coventry, England.

CHARLES E. BLYTH.